United States Patent [19]

Reynolds et al.

[11] 3,733,523

[45] May 15, 1973

[54] ELECTRONIC CIRCUIT CARD CAGE

[75] Inventors: Don E. Reynolds, Redondo Beach; Daniel R. O'Neill, Palos Verdes Peninsula; Jagdish M. Puri, Azusa, all of Calif.

[73] Assignee: Ampex Corporation, Redwood City, Calif.

[22] Filed: Feb. 11, 1972

[21] Appl. No.: 225,469

[52] U.S. Cl. ..............................317/101 DH, 211/41
[51] Int. Cl. ..............................................H02b 1/02
[58] Field of Search ..............................317/101 DH; 339/17 M, 17 LM, 176 MP; 211/41

[56] References Cited

UNITED STATES PATENTS

| | | | |
|---|---|---|---|
| 3,458,767 | 7/1969 | Hedger et al. | 317/101 DH |
| 3,377,515 | 4/1968 | Erb | 317/101 DH |
| 3,015,755 | 1/1962 | Wright et al. | 317/101 DH |
| 3,511,385 | 5/1970 | Ayling | 317/101 DH |

FOREIGN PATENTS OR APPLICATIONS

| | | | |
|---|---|---|---|
| 1,429,670 | 1/1969 | Germany | 211/41 |
| 64,493 | 5/1968 | Germany | 211/41 |

OTHER PUBLICATIONS

"Scanbe Total Performance Products" Scanbe Manf. Corp. 9–66
General Ceramics, Electronic Design, 3–61 P. 34.

*Primary Examiner*—David Smith, Jr.
*Attorney*—Robert G. Clay

[57] ABSTRACT

An extremely strong and adaptable card cage for removably receiving a number of circuit cards has spaced apart thick-walled apertured planar side panels extending longitudinally between spaced apart planar end panels and forming a hollow rectangular shell having an open top or bottom. Vertical or transverse grooves in the side walls receive card edges, the side panels being of high thermal conductivity materials and acting as a heat sink. More than one printed circuit card size can be accommodated by utilizing an internal thick-walled guide panel of shorter length between and parallel to the two side panels. The side and guide panels receive mounting brackets along their base edges which have planar, facing flanges for transversely and removably mounting electrical connector blocks which are are secured by resilient clips. When slid into the card cage, a printed circuit merely plugs into one or more electrical connector blocks. Small cards are inserted in facing grooves between an internal panel and one of the side panels, while larger cards are inserted between the side panels at a location having no interposed guide panel.

6 Claims, 4 Drawing Figures

ELECTRONIC CIRCUIT CARD CAGE

BACKGROUND OF THE INVENTION

1. Field of the Invention

This invention relates to printed circuit card cages and more particularly to card cages for slidably receiving printed circuit cards with plug connections.

2. History of the Prior Art

Present day electronic component fabrication techniques utilize a modular construction wherein components, such as integrated circuit elements and discrete circuit components, are mounted on printed circuit cards which are held by card cages. Such cards must be able to merely plug into a card cage with no permanent wiring connections and must be easily removable for repair or replacement.

Presently known card cages come in either fixed sizes which are not easily adaptable to accommodate varied sizes of printed circuit cards or which have a building block type of construction requiring substantial manufacturing labor. Furthermore, presently known card cages are generally manufactured from materials having low thermal conductivities. Such materials make dissipation of heat generated by many closely spaced cards quite difficult. Particular problems are encountered with systems using high density integrated circuits, because substantial heat can be generated within a small volume.

SUMMARY OF THE INVENTION

A printed circuit card cage in accordance with the invention has two spaced apart planar end panels between which are mounted two or more spaced apart, generally planar thickwalled and apertured side panels. The side panels are of an integral metal construction and have longitudinal base members and vertical card edge receiving grooves along their inner planar sides. An internal guide panel may be positioned between the side panels with a longitudinal base portion extending between the end panels and a web portion defining card edge receiving grooves extending at least part way between the end panels. Small cards can be mounted in facing grooves between the internal panel and the side panels, and large cards can be mounted between the side panels where the web portion of the internal guide panel is not interposed. Different sizes of cards can be easily accommodated by varying the spacing between panels.

Plug connections to the printed circuit cards are provided by transverse electrical connector blocks which are mounted by removable resilient clips to facing flanges of elongated mounting brackets fastened to base edges of the side panels. The removable mounting permits connector blocks to be easily added, removed or moved to a different location for easy modification of the card cage assembly.

Even though card cage assemblies in accordance with the invention retain the versatility of the building block types of assembly, they can be quickly assembled at low cost. Control of the lengths of and spacing between guide panels permits effective control over the numbers of printed circuit cards and their sizes. However, regardless of the shape or size desired, assembly requires only the insertion of a few screws for each panel and the snapping in place of the resilient clips and connector blocks.

In addition, the strong unitary construction of the thick-walled side and internal panels serves as an excellent heat sink when constructed of a high thermal conductivity material such as die cast aluminum or another suitable metal.

BRIEF DESCRIPTION OF THE DRAWINGS

A better understanding of the invention may be had from a consideration of the following detailed description taken in conjunction with the accompanying drawings in which.

DETAILED DESCRIPTION

Figure 1:
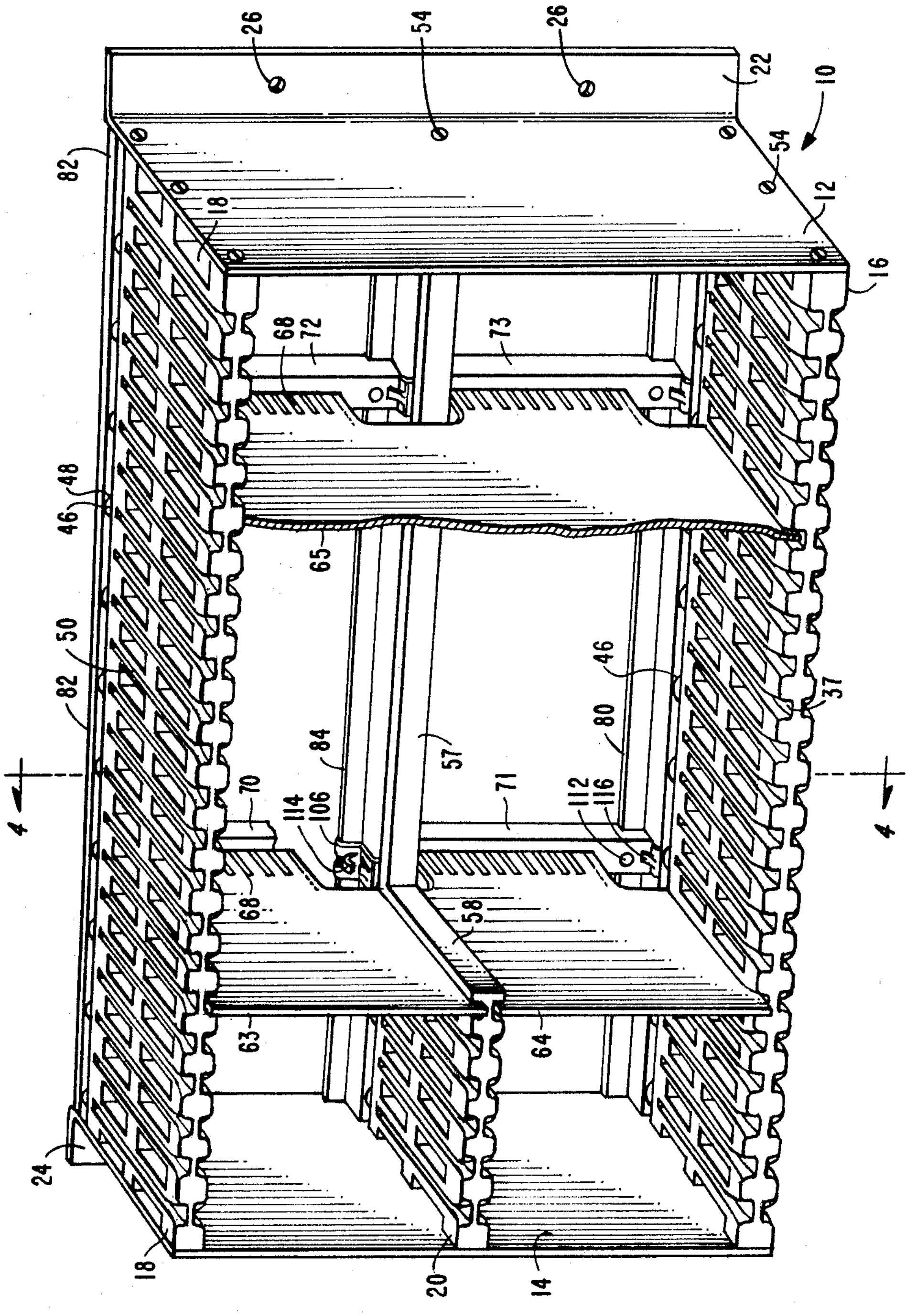
FIG. 1 is a perspective view, partially broken away, of a card cage assembly in accordance with the invention.

As shown in FIG. 1, a card cage 10 in accordance with the invention has two longitudinally spaced apart generally planar end panels 12, 14 supporting three guide panels including side panels 16 and 18 and an internal panel 20, and having a generally rectangular outline with an open top as viewed in plan. In the following description the terms "vertical," "top" and "bottom" will be used for ease of understanding, with reference to the attitude in which the card cage is level and cards are inserted vertically from the top. Flanges 22, 24 extend outwardly from a base portion of the end panels 12, 14 respectively and have holes 26 therein for mounting the card cage assembly 10 to a frame or cabinet (not shown).

Figures 2, 3, 4:
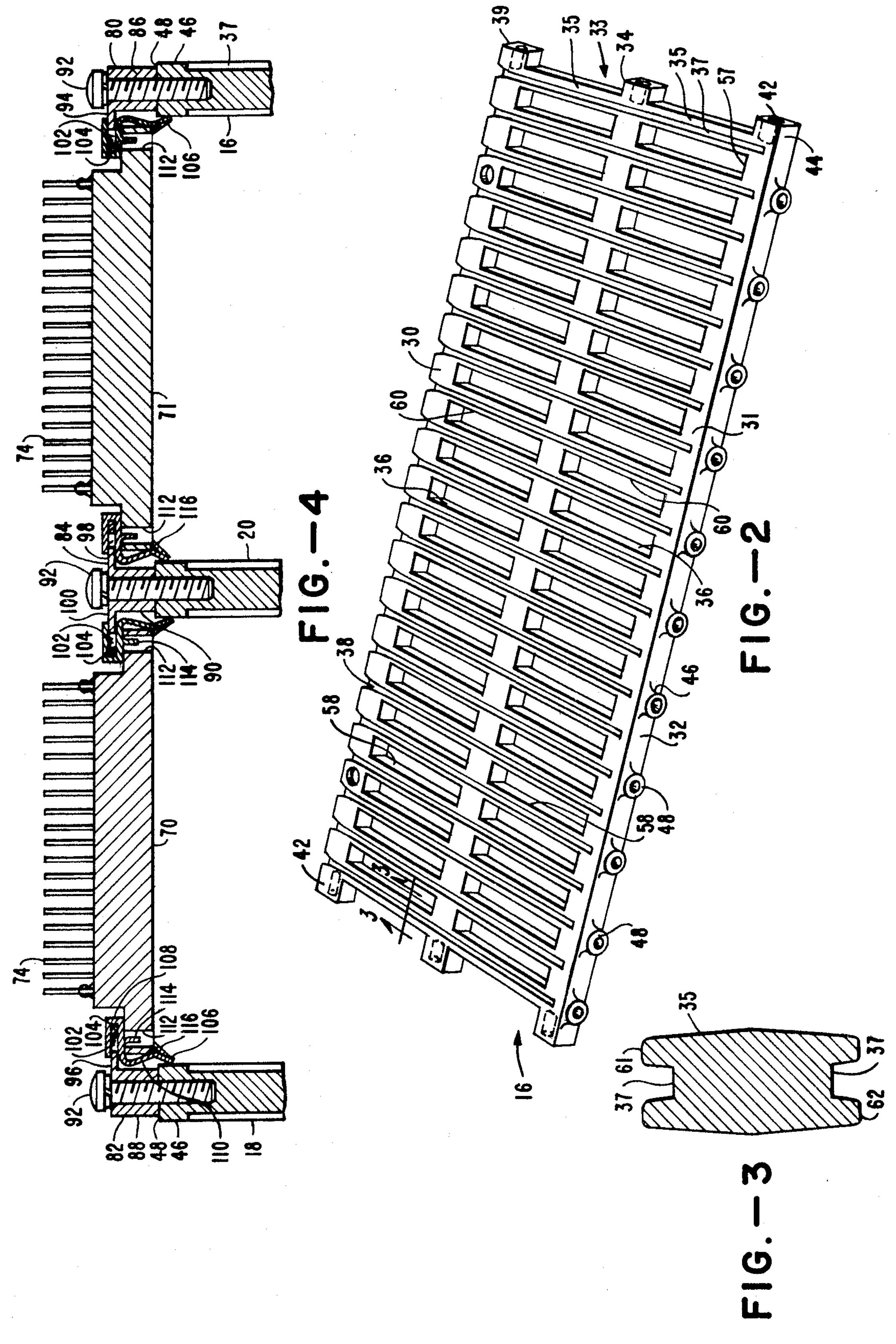
FIG. 2 is a side view of a guide panel used in the card cage as shown in FIG. 1.
FIG. 3 is a sectional view taken along line 3—3 in the direction of the arrows as shown in FIG. 2 and illustrates the cross-sectional shape of a rib on a guide panel.
FIG. 4 is a fragmentary sectional view taken along line 4—4 in FIG. 1 in the direction of the arrows and shows the manner of mounting electrical connector blocks in accordance with the invention.

The internal panel 20 and the side panel 18 have a construction similar to the side panel 16 which is shown in greater detail in FIG. 2, to which reference is now made.

The relatively thick panel 16 has an integral construction which may be of die cast aluminum and has a generally rectangular configuration which is bounded on the top and bottom by longitudinally extending rail and base members 30, 31, respectively, each having a generally square cross sectional shape. A generally planar web portion 33 having a thickness equal to the rail and base members 30, 31 extends therebetween to define the interior portion of the panel 16. The web portion 33 includes a longitudinal central member 34 extending in parallel relationship midway between the rail and base members 20, 31 and having a generally square cross sectional shape similar thereto. Further defining the web portion 33 are a series of narrow, transversely extending, integral ribs 35 which are aligned in pairs to extend from opposite surfaces of the central member 34 to the rail and base members 30, 31 respectively. The ribs 35, which are regularly spaced along the longitudinal direction with apertures 36 therebetween, complete the definition of the web portion 33. The apertures 36 permit cooling air to be circulated through the card cage 10.

The thickness of the panels 16, 18, 20 (about one-half inch in this example) makes them strong enough to provide the primary structural rigidity for the card cage 10 and also makes them excellent heat sinks so that they can conduct away and dissipate heat generated by electronic components mounted within the card cage 10. Additionally the panels 16, 18, 20 should have sufficient thickness to accommodate back-to-back circuit card edge receiving grooves 37 on opposite sides thereof.

The grooves 37 extend transversely along each rib pair from an open mouth 38 at an upper edge 39 of the rail 30 to a closed termination within the base member 31. The grooves 37 are generally rectangular in cross section and have a width and depth suitable for slidably receiving the edge of a removably mounted printed circuit card. The mouth 38 of each groove 37 is chamfered to facilitate alignment of the edge of a printed circuit card when it is being slidably inserted therein.

While the panels 16, 18, 20 are shown as having grooves 37 on both sides thereof, the grooves 37 may be omitted from the outer surface of the side panels 16, 18 if desired.

The opposite ends of the longitudinal rail 30, base 31, and central member 34 have longitudinally extending holes 42 bored therein which are tapped to receive screws 54 for fastening to the end panels 12 and 14 as shown in FIG. 1.

Longitudinally spaced along a bottom or base edge 44 of the base member 31 of each panel 16, 18 and 20 are a plurality of bosses 46 which have flat surfaces 48 lying in a common plane which is somewhat spaced apart from the bottom edge 44 of the base member 31.

As further shown in FIG. 1, the rail 30 and web portion 33 of the internal panel 20 extend only partway along the longitudinal distance from the end panel 14 toward the end panel 12, though the base member 31 extends over the full distance. This discontinuity may be implemented by severing the material of the web portion 33 longitudinally along an upper edge 57 of the base member 31 opposite the bottom edge 44 and vertically along a plane 58 adjacent a rib element 35 and parallel to a groove 37. Alternatively, the undesired part of the web portion may be omitted when the guide panel is manufactured, avoiding the need for later cutting. If desired, a web portion may be located at each end of a guide panel with each portion extending longitudinally towards the opposite end and a central part of the web portion between them omitted. This can be accomplished by cutting along a vertical plane 60 spaced apart from the vertical plane 58 and along the portion of the upper edge 57 of the base member 31 between the planes 58 and 60. It is desirable to have a web portion 33 of a panel 16 abut at least one of the end panels 12, 14 for greater strength and support.

As shown in FIG. 3, a rib 35 has a cross-sectional shape of an ellipse truncated at each end by planes 61 and 62 which are parallel to the flat planar surfaces of the panels 16, 18 and 20. The grooves 37 have a generally rectangular cross-sectional shape and a size corresponding to the edge thickness of printed circuit cards which the grooves 37 are intended to slidably receive. The thickness of the rib 35 in a direction perpendicular to the planes 61, 62 is about one-half inch and exceeds the width of the rib in the longitudinal direction which is about three-eighth inch or less at the widest position near the center thereof. This substantial thickness gives the portions of the outer circumference of the rib 35 which extend between the planar surfaces 61 and 62 and which form portions of the boundary surfaces of adjacent apertures 36 sufficient area to facilitate a substantial heat transfer between each rib 35 of the panels 16, 18 and 20 and the fluid, typically but not necessarily air, which flows through the apertures.

Although the card cage assembly 10 is shown in FIG. 1 as having only two small printed circuit cards 63, 64 and one large printed circuit card 65 (partially broken away) mounted therein for clarity, a printed circuit card may be slidably inserted between each facing pair of oppositely positioned grooves 37 with small cards being accommodated where the web portion 33 of the internal panel 20 is defined and large cards being accommodated where the web portion 33 of the internal panel 20 is discontinuous. The printed circuit cards 63, 64, 65 have pin connections 68 printed thereon which slide into electrical connector blocks 70, 71, 72 and 73, the block 70 being partially broken away. The connector blocks 70–73 receive the pins 68 from one side to form plug connections and have corresponding pins 74 on the opposite side for making permanent wiring connections as shown in FIG. 4.

An L-shaped side mounting bracket 80 is mounted on the surfaces 56 of the bosses 55 at the bottom of the panel 16. Similarly, an L-shaped mounting bracket 82 is mounted at the bottom of a side panel 18 and a T-shaped mounting bracket 84 is mounted at the bottom of the internal panel 20. As more clearly illustrated in FIG. 4, the mounting brackets 80, 82 and 84 have web members 86, 88 and 90 respectively fastened by a plurality of longitudinally spaced screws 92 to the surfaces 56 of the bosses 55 on the guide panels 16, 18 and 20 respectively. The web member 86 supports a planar flange 94 which extends part way toward the internal mounting member 84. The web member 88 on the side mounting member 82 supports a generally planar flange 96 extending part way toward the internal mounting member 84 which supports first and second planar flanges 98, 100 extending part way toward the side mounting brackets 80 and 82 respectively. The flanges 94, 96, 98 and 100 each have a plurality of longitudinally spaced apertures 102 therethrough, each in alignment with a groove 37, and receive a tab 104 on a resilient clip 106, such as that sold under the designation "Speed Clip." Each Speed Clip 106, has a generally U-shaped portion 108 which hooks over the facing edges of the flanges 94, 96, 98 and 100 and a planar portion 110 depending downward from the U-shaped portion 108. Each end of an electrical connector block 70–73 has an aperture 112 therethrough which receives a tab 114 which depends downward from the lower surface of the U-shaped portion of a Speed Clip 106 as it is snapped between the lower surface and a tab 116. With each end being similarly fastened, the electrical connector block 70 is mounted to extend between the facing flanges 94 and 98 and is aligned to receive the printed circuit card 63 as it is slidably inserted between an opposing pair of grooves 37 in the card cage assembly 10.

Although there has been described above a specific arrangement of a card cage assembly in accordance with the invention for the purpose of illustrating the manner in which the invention may be used to advantage, it will be appreciated by those skilled in the art that the invention is not limited thereto. Accordingly, any and all modifications, variations, or equivalent arrangements which may occur to those skilled in the art should be considered to be within the scope of the invention.

What is claimed is:

1. A card cage for mounting printed circuit cards comprising:
- first and second generally planar spaced apart end members;
- first and second generally planar spaced apart side members, each being relatively thick walled and having a plurality of apertures, extending between said first and second end members in a longitudinal direction and forming a hollow rectangular structure with said end members, said side members each having a base edge and a plurality of oppositely positioned pairs of longitudinally spaced apart transverse grooves in facing sides thereof, said grooves extending from an upper edge to a position near but not communicating with an opposite base edge;
- a generally planar, relatively thick walled and internally apertured internal guide member having a base member disposed to extend longitudinally between the first and second end members, said base member having a base edge aligned with the base edges of the first and second side members, said internal guide member having an integral web portion extending from at least one end member part way toward the opposite end member with a discontinuity therein permitting a printed circuit card to be slidably inserted between a facing pair of said oppositely positioned transverse grooves in the first and second side members, said web portion having transverse grooves in opposite sides thereof extending from an upper edge to a position near but not communicating with the lower edge, said grooves being longitudinally spaced along the web portion with each groove being opposite a facing groove in one of said side members.

2. A card cage as set forth in claim 1 above, further comprising connector block means including a plurality of electrical connector blocks extending between the planes of the first side member and the internal member and a plurality of electrical connector blocks extending between the planes of the second side member and the internal member, said connector blocks being positioned near the base edges of said side and internal guide members and longitudinally spaced for alignment with an opposing pair of grooves.

3. A card cage for mounting printed circuit cards comprising:
- first and second generally planar spaced apart end members;
- first and second generally planar spaced apart side members, each being relatively thick walled and having a plurality of apertures, extending between said first and second end members in a longitudinal direction and forming a hollow rectangular structure with said end members, said side members each having a base edge with a plurality of longitudinally spaced apart bosses having a surface lying in a common plane integral therewith and a plurality of oppositely positioned pairs of longitudinally spaced apart transverse grooves in facing sides thereof, said grooves extending from an upper edge to a position near but not communicating with an opposite base edge;
- a generally planar, relatively thick walled and internally apertured internal guide member having a base member and disposed longitudinally between the first and second end members, said base member having a base edge aligned with the base edges of the first and second side members and a plurality of longitudinally spaced bosses having a surface lying in the common plane of the side member boss surfaces integral therewith, said internal guide member having an integral web portion extending from at least one end member at least part way toward the opposite end member, said web portion having transverse grooves in opposite sides thereof extending from an upper edge to a position near but not communicating with the lower edge, said grooves being longitudinally spaced along the web portion with each groove being opposite a facing groove in one of said side members;
- an elongated longitudinally extending internal mounting bracket having a web member abutting the bosses on the base edge of the internal member supporting thin, planar flanges on either side thereof lying in a plane parallel to and spaced apart from the common plane; and
- first and second elongated longitudinally extending side mounting brackets having a web member abutting the bosses on the base edges of the first and second side members respectively, each having a thin planar flange on the side thereof facing the internal mounting bracket and lying in the plane of the flanges of the internal mounting bracket.

4. The card cage as set forth in claim 3 above, further comprising a plurality of electrical connector blocks having first and second ends and a pair of springs for each connector block, one securing a first end to a flange of a side mounting bracket in alignment with one groove, and the other securing the second end to a flange of the internal mounting bracket in alignment with a plane extending between said one groove and an opposing groove.

5. The card cage as set forth in claim 4 above, wherein said side members and the web portion of said internal members each have pairs of apertures therethrough located between adjacent pairs of grooves, one first aperture of each pair extending from a location near the upper edge to a location above a longitudinal center line, the other extending from a location below the center line to a location near the base edge.

6. A card cage for mounting printed circuit cards comprising:
- first and second generally planar spaced apart end members;
- first and second generally planar spaced apart side members extending between said first and second end members in a longitudinal direction and having opposite upper and base edges, the base edges having a plurality of longitudinally spaced apart bosses integral therewith, each of the bosses having a surface lying in a common plane, said side members having a plurality of oppositely positioned pairs of longitudinally spaced apart transverse grooves in facing sides thereof, said grooves extending from the upper edge to a location near but not communicating with the base edge;

first and second elongated mounting brackets having web members fastened to the surfaces of the bosses of the first and second side members respectively, said web members supporting generally coplanar flanges in facing relationship; and a plurality of electrical connector blocks mounted to extend between the facing flanges, each aligned to receive a printed circuit card slidably inserted between an opposing pair of grooves.

* * * * *